United States Patent [19]

Mosher et al.

[11] Patent Number: 4,466,500

[45] Date of Patent: Aug. 21, 1984

[54] COMBINATION WEIGHING SYSTEM

[75] Inventors: Oren A. Mosher; Oren G. Mosher, both of Hayward; Ellwood S. Douglas, Orinda, all of Calif.

[73] Assignee: Package Machinery Company, Oakland, Calif.

[21] Appl. No.: 430,354

[22] Filed: Sep. 30, 1982

[51] Int. Cl.³ .................... G01G 7/00; G01G 19/22; G01G 19/413

[52] U.S. Cl. ........................... 177/1; 177/25; 177/50; 364/567

[58] Field of Search .............. 177/25, 50, 1; 364/567; 209/592

[56] References Cited

U.S. PATENT DOCUMENTS 4,388,975  6/1983  Hirano ............................ 177/25
4,396,078  8/1983  Minamida et al. ............... 177/25 X Primary Examiner—E. A. Goldberg
Assistant Examiner—P. Foster
Attorney, Agent, or Firm—McCormick, Paulding and Huber

[57] ABSTRACT

A combination weighing system searches a plurality of scales for a combination which provides a minimum total weight of product not less than a pre-established target weight. The search for the best combination is performed on the basis of an ordered search sequence of all combinations, and certain steps of the sequence and corresponding combinations are omitted from the sequence if they involve subcombinations previously searched and found to be at or above the target weight. The scales produce signals representative of the product weight, and the signals are calibrated and processed to eliminate measurement errors.

20 Claims, 11 Drawing Figures

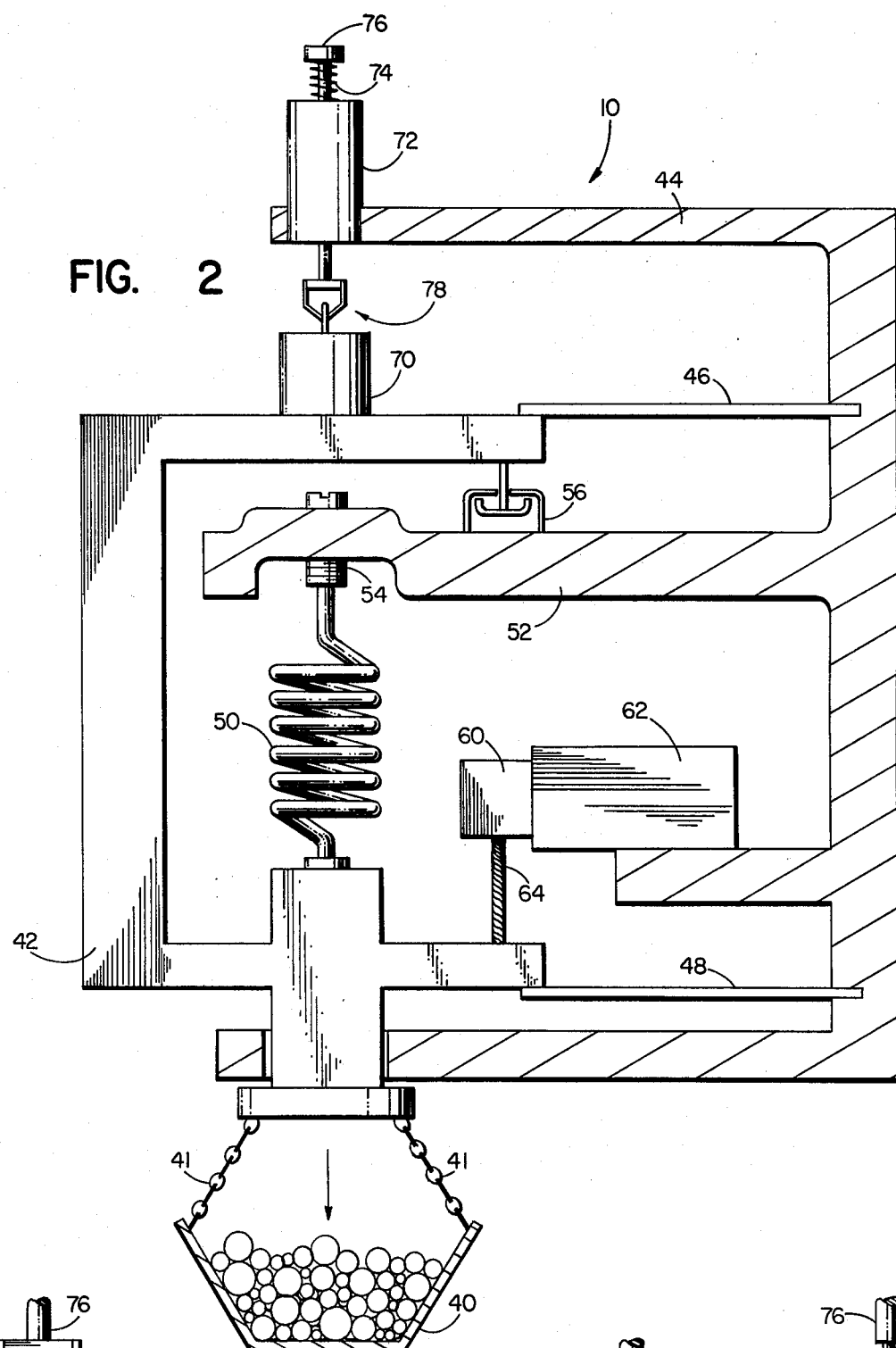
FIG. 2
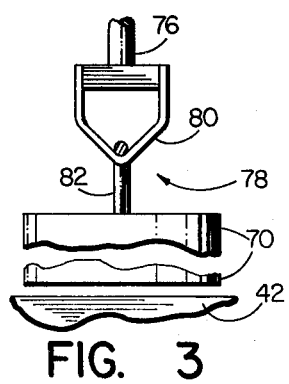
FIG. 3
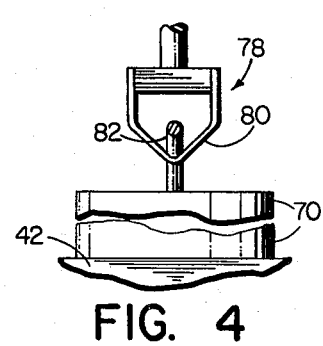
FIG. 4
FIG. 5

| ADDEND | 8 | 4 | 2 | 1 | 1 | 2 | 1 | 1 | 4 | 2 | 1 | 1 | 2 | 1 | 1 |
|---|---|---|---|---|---|---|---|---|---|---|---|---|---|---|---|
| COMBINATION | a | b | c | d | e | f | g | h | i | j | k | l | m | n | o |
| | 1 | 1 | 1 | 1 | 1 | 1 | 1 | 1 | 2 | 2 | 2 | 2 | 3 | 3 | 4 |
| | — | 2 | 2 | 2 | 2 | 3 | 3 | 4 | — | 3 | 3 | 4 | — | 4 | — |
| | — | — | 3 | 3 | 4 | — | 4 | — | — | — | 4 | — | — | — | — |
| | — | — | — | 4 | — | — | — | — | — | — | — | — | — | — | — |

COMBINATION WEIGHING SYSTEM

BACKGROUND OF THE INVENTION

The present invention relates to weighing systems and is concerned in particular with weighing systems utilizing a plurality of scales to achieve a minimum qualified weight from a selected combination of the scales.

Many products such as fruits, vegetables, candies and other small items are produced or manufactured with varying sizes and weights, and are handled in bulk quantities prior to being separated in groups and packaged. Combination weighing systems have been developed for selecting from a plurality of individual scales containing the product a particular combination of scales which cumulatively provides a total weight closely approximating or equaling the target or stated contents weight. Such weighing systems are described, for example, in U.S. Pat. Nos. 3,939,928 and 4,267,894.

Combination weighing systems have become more common through the advent of the microprocessor which is capable of sampling multiple combinations of scales in a very short period of time and determining which combination most satisfactorily provides a target weight. When the combination has been identified, those scales belonging to the combination are dumped into a common chute which discharges the collected product into a film wrapper or other container in a packaging machine. The process may be carried out repeatedly by a microprocessor with the scales reloaded or with the dumped scales eliminated from the search processes until they are reloaded.

The flexibility of microprocessors allows a multitude of scales to be examined during the search process and permits weight parameters to be readily adjusted in accordance with varying product and production demands. However, it is important that the weight information from each scale be accurate throughout extended periods of use and not be affected by drift in the components which process the weight information. For this reason, calibration systems are generally employed in the scale, and the systems are periodically activated to update the weighing parameters used by the processor.

Sampling of a weight in a given scale is frequently complicated by the environment in which the scales operate. Scales are commonly loaded from a vibrating feeder, and in order to isolate the scales and the weight measurement from the effects of the vibrator, resilient mounts support the critical measuring sensors and the scales. Nevertheless, spurious errors are introduced into the weight signals and produce inaccurate results in the final weight.

In spite of the speed with which microprocessors operate in comparison to the mechanical weighing devices, cycle times for performing the microprocessor functions are important because they are added to the sampling and reading times, and one microprocessor may service a number of scales which are loaded in staggered sets.

It is accordingly an object of the present invention to provide solutions to the problems mentioned above.

SUMMARY OF THE INVENTION

The present invention resides in a combination weighing system that is designed to search for and obtain a minimum qualified weight of product from among multiple quantities of the product. The system includes a plurality of scales, each of which receives and weighs a quantity of the product and provides a weight signal representative of the weight in the scale.

In one aspect of the invention, the scale has a weighing tray for holding the product and a member such as a strain gauge that is strained by the weight of product during a weighing operation. Calibration means are provided in the scale to determine the parameters of tare and slope in a weighing calculation, and included in the calibration means is a weight of known amount that is lowered and raised from the scale in a calibration process. The weight is joined with an actuator means, such as an air cylinder, by a coupling having first and second interlocking members that disengage automatically when the weight is resting on the scale.

In another aspect of the invention, the output signals from the scale are sampled and processed to improve accuracy and eliminate spurious errors caused by vibrations and other disturbances. Signal averaging means are connected with the scale to receive the output signal and include sampling means for sampling the signal multiple times to establish the average value of the signal from the various samples.

In still a further aspect of the invention, the combination of scales which provides the minimum qualified weight is identified through a search operation based upon an ordered search sequence of all combinations of the scales. The search is conducted by a search control means which has means for omitting from the search, combinations of scales having subcombinations previously searched and found to be qualified at or above a target weight. Elimination of certain combinations from the search sequence reduces cycle time. The search sequence is also established by adding one new or different scale to the combinations or subcombinations previously searched. It this manner, the volume of data manipulated during each step of a search sequence is minimized with corresponding improvements in cycle time.

BRIEF DESCRIPTION OF THE DRAWINGS

FIG. 2 is a horizontal elevation view partially in section of a weighing scale including calibrating and weight-sensing mechanisms.

FIG. 3 is a fragmentary view of the calibrating mechanism in FIG. 2 and shows the coupling engaged.

FIG. 4 is a fragmentary view of the calibrating mechanism and shows the coupling disengaged.

FIG. 5 is an alternative embodiment of the coupling in FIGS. 3 and 4.

DESCRIPTION OF THE PREFERRED EMBODIMENTS

Figure 1:
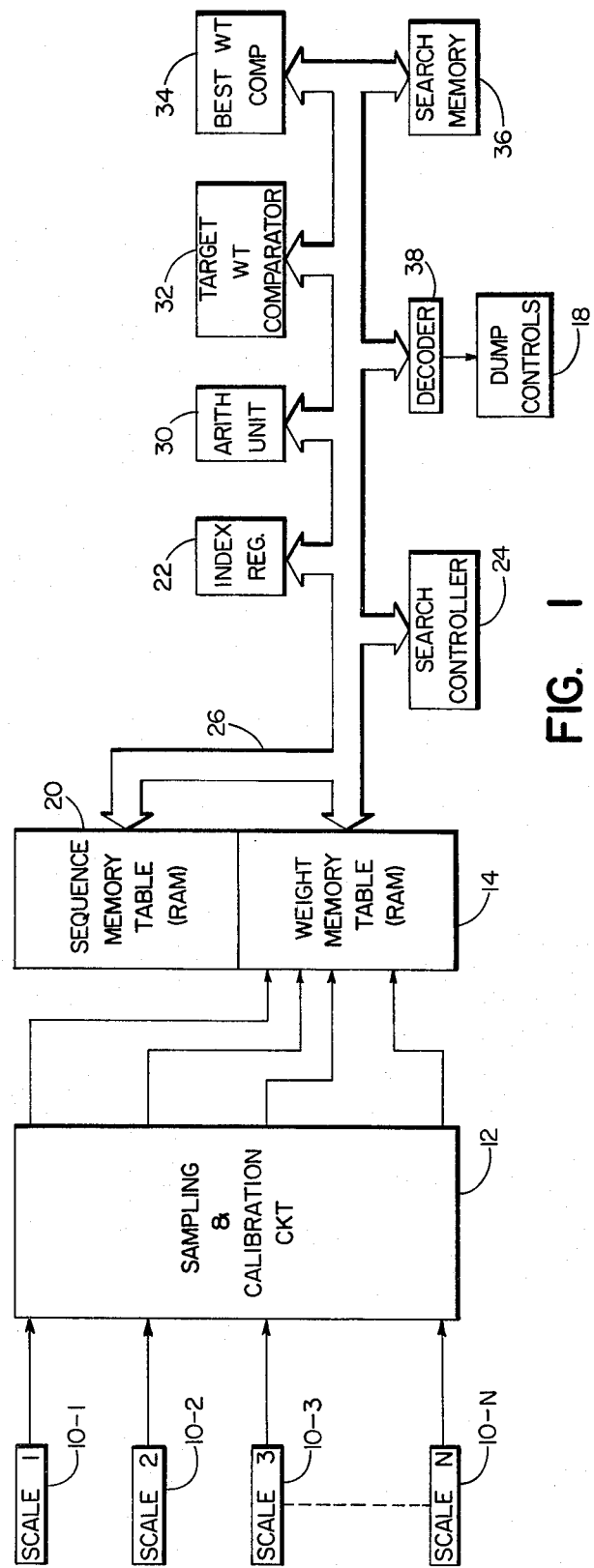
FIG. 1 is a block diagram schematically illustrating a combination weighing system embodying the present invention.

FIG. 1 illustrates the principal components of a combination weighing system which searches for and obtains the best combination of scales which collectively provide a measured weight of product not less than a predefined target weight. The products may be fruit, nuts or other items which have random weights and which are loaded in groups into the plurality of scales from which the combination is selected. When a "best" combination has been established, the corresponding scales are dumped into a collector device or funnel for wrapping or deposit in a single package at the measured weight. The system may have any number "n" of scales 10, which are respectively designated 10-1, 10-2 . . . 10-N.

Each of the scales 10 has the same basic construction, which is described in greater detail below in connection with FIGS. 2–5, and produces an electrical output signal indicative of the weight of product loaded in the scale for sampling and calibration circuits 12. After suitable sampling and other processing, the weight data acquired from the electrical signals is loaded into a weight memory table 14 to more easily facilitate the location of weight data during a search for the best combination. In a preferred embodiment of the invention, the memory table and all of the components in FIG. 1 apart from the scales and the dump controls 18 are comprised by a microprocessor having the capability of formulating the illustrated elements when programmed. One commercially available microprocessor suitable for this function is a model 6809E manufactured by Motorola, Inc. of Austin, Tex.

Within the microprocesssor, the weight memory table 14 is formed from part of a random access memory that is shared with a sequence memory table 20. The sequence memory table is operated in conjunction with an index register 22 and a search controller 24 through a data bus 26 to maintain a current record of the unexhausted sub-combinations and corresponding weights during a search operation. A more detailed description of the function and operation of the tables 14 and 20 is provided below in connection with FIG. 9.

An arithmetic unit 30 receives the weight data for the scales of each combination and adds the weights together to obtain a subtotal for the combination. The target weight comparator 32 compares the subtotal with a predefined target weight that represents, for example, the desired weight in each package produced by the system. If a subtotal is equal to or exceeds the target weight, then that combination of scales will provide a qualified weight for packaging. In comparator 34 all qualified weights are compared with the best qualified weight previously located during the search operation. If the previously located weight is larger, then the currently searched combination and weight replace the previous best weight and combination stored in the search memory 36. As the search process continues, the best weight stored in the search memory may be periodically replaced by lower qualified weights, and when the search process has been completed, the minimum qualified weight and corresponding combination may be read from the memory through a decoder 38. The decoder supplies dump information to the dump controls 18, and those scales comprising the best combination are dumped and then refilled for another search. The process continues in cyclic fashion as long as there is product and packages to be filled.

The combination weighing system in a preferred embodiment employs a programmed microprocessor to conduct the search and comparison operations because microprocessors provide the speed and accuracy for performing the arithmetic and comparison operations in cyclic fashion. The processors also permit system parameters, such as the number of scales and the magnitude of the target weight, to be varied by simple changes in programmed data.

FIG. 2 illustrates the structure of one scale 10 with provisions for calibrating the output signal automatically between weighing operations. The scale includes a tray structure comprised by a weighing tray 40 suspended from a balance beam 42 within the scale housing 44. The tray 40 is suspended by chains 41 from the balance beam and may be dumped by the controls 18 in FIG. 1. The balance beam is supported by flex hinges 46, 48 from the housing and by a range spring 50 which is placed in tension by the tray 40 and weight thereon. The range spring is secured at its lower end to the balance beam and at its upper end to a cantilevered arm 52 of the housing by an adjusting screw 54. The screw can be adjusted in the tare condition to approximately center the balance beam 42 within the housing. A dash pot 56 extends between the balance beam and the cantilevered arm 52 to damp oscillations of the balance beam brought about by the mass and spring components of the system.

A load sensor which in the preferred embodiment is a strain gauge 60, is mounted at the projecting end of a support block 62 secured in the housing. A straining member or wire 64 is connected between the gauge and the balance beam 42.

When product is loaded into the weighing tray 40, both the range spring 50 and the strain gauge 60 are strained; however, due to its greater stiffness, the gauge absorbs the principal portion of the load and produces an output signal which is representative of the weight of the product loaded plus any tare weight, that is the weight of the balance beam 42 and tray 40 which is not supported by the range spring 50 in the unloaded condition. Product which adheres to the weighing tray 42 after a dump operation also becomes a part of the tare weight.

In order to calibrate the scale 10 and eliminate tare weight from the weighing operations, a calibration weight 70 is suspended from the housing 44 by a pneumatically operated spring and cylinder assembly 72. Normally the cylinder assembly is deactivated and the spring 74 surrounded the piston rod 76 at the upper end of the assembly lifts the calibration weight clear of the balance beam 72 and other tray structure. However, during a calibration operation, the assembly 72 is actuated and the piston lowers the calibration weight 70 onto the balance beam as shown. Through a unique coupling 78 the cylinder assembly 72 is totally disengaged from the calibration weight, and thus only the addition of the calibration weight 70, which is of known amount, is felt by the strain gauge 60.

FIGS. 3 and 4 illustrate the unique coupling 78 and its method of operation in greater detail. In FIG. 3, the coupling is comprised by a first link 80 depending from the piston rod 76 and a second link 82 projecting rigidly upward from the body of the calibration weight 70. When the weight is supported free and clear of the balance beam 42 as shown, the links 80, 82 are contacting and in load transmitting relationship due to gravitational forces on the weight. However, when the calibration weight 70 is lowered onto the beam 42 as shown in FIG. 4, the links 80, 82 become automatically disengaged although they are still interlocked, and the full mass of the calibration weight including the link 82 is supported on the beam. The coupling 78 formed by the links is simple in structure and precise in operation. The coupling totally uncouples the air cylinder 72 which lifts the calibration weight from the beam and insures that it is only the weight and not the cylinder or any portion thereof which influences the measurements taken while calibrating.

It is important to have an accurate weight signal from the scale especially when the contents of several scales are being measured to obtain a desired target weight. If each scale is inaccurate, the inaccuracies are carried forward cumulatively into the combination weight. Additionally, drift in the electrical or measuring portions of the system may cause further error. All of these errors can be circumvented by periodically calibrating the output of the scale.

A calibration operation is performed by first reading the output of the strain gauge 60 while the scale is empty and by then lowering the calibration weight onto the tray structure and taking a second reading. The first reading constitutes the tare weight and the second reading represents the magnitude of the tare and calibration weight which is known. By subtracting the two readings, a scale factor or slope of the output signal is obtained for use in accurately measuring subsequent loads above and below the calibration weight.

FIG. 5 shows an alternate embodiment of the coupling between the cylinder 72 and the calibration weight 70. In this embodiment, a cup 86 secured to the weight 70 loosely envelopes a ball 88 suspended from the piston rod 76 by a cord 90. The cup is swaged or otherwise closed to form at its upper end an aperture 92 smaller than the diameter of the ball 88. The weight 70 may be raised by the piston rod 76 and be lowered and disengaged from the rod when the ball reposes at a central position within the cavity of the cup. The cup 86 and the ball 88 are functionally equivalent to the links 80, 82.

Figure 6:
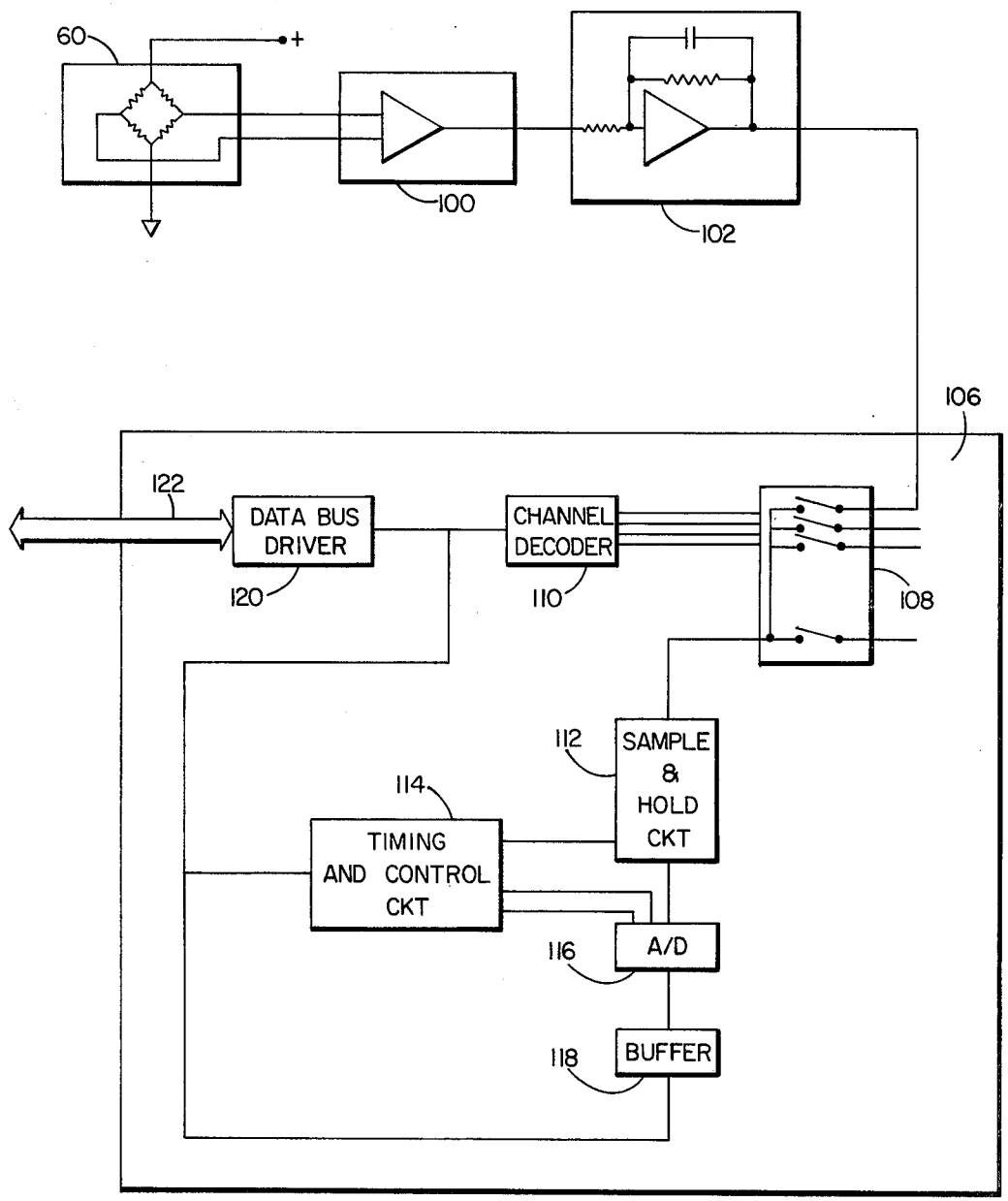
FIG. 6 is an electrical diagram of the weight signal acquisition components of the combination weighing system.

FIG. 6 illustrates the electrical circuitry which acquires weight data from the strain gauges 60 in the scales of the combination weighing system of FIG. 1. The strain gauge is typically a bridge structure, and the output of the bridge is fed to a high-gain instrumentation amplifier 100. In one embodiment of the invention, the amplifier converts the differential signal of the strain gauge to a single ended signal and amplifies it by a factor of 600.

The output of the instrumentation amplifier is applied to a low-pass RC filter circuit 102 which has, for example, a 30 millisecond time constant to suppress high order signal oscillations due to vibrations of feeders and other environmental factors surrounding the scales. The filtering circuit operates in combination with mechanical isolators in which the scales are generally mounted.

The sampling and calibration circuits 12 of FIG. 1 include a scale selecting and sampling circuitry 106 in FIG. 6. This circuitry receives the strain gauge signals from each scale in a multiplexer 108 controlled by a channel decoder 110. The decoder causes the multiplexer to sample the output signals from each scale in order, and the sampled values are sequentially loaded into a sample and hold circuit 112. Timing and control of the decoder 110 and sample circuit 112 is controlled by the circuitry 114, and the sampled signals are transferred serially from the circuit 112 to an analog-to-digital converter 116.

In order to improve the reliability of the weight signals from the scales, the signals are sampled several times and then averaged. For example, in one embodiment of the invention having ten scales, the conversion to digital format is postponed until approximately 130 to 140 milliseconds prior to dumping of the scales. Each output signal is then converted to a digital value once every five milliseconds, and the digital signals are relayed to a data bus 122 through a buffer amplifier 118 and data bus driver 120.

Figures 7, 8:
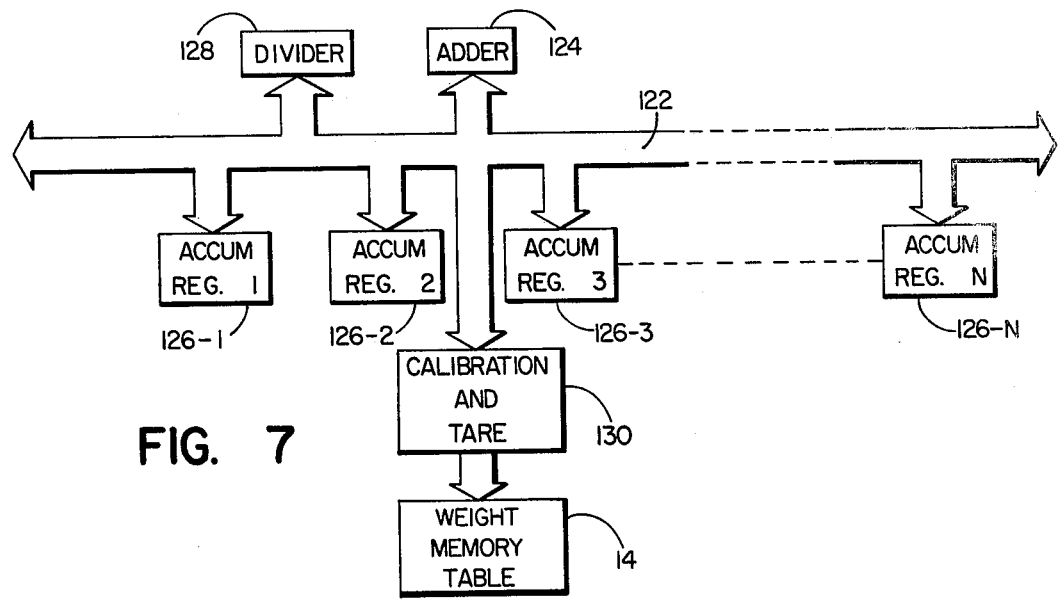
FIG. 7 is a diagram of the signal averaging and calibration elements in a microprocessor of the combination weighing system.
FIG. 8 is a chart showing all of the combinations of scales in the search sequence of a four-scale system.

The sampled signals are averaged in the elements of the data processor shown in FIG. 7. The consecutively sampled values from a given scale are combined in the adder 124. The added signals are stored during the sampling period in an accumulating register 126-1, 126-2, 126-3 . . . or 126-N corresponding to the particular scale from which the signal originated. For example, the digital value of the signal from scale No. 1 is sampled sixteen times at 5 millisecond intervals for a total sampling period of 80 milliseconds. The sixteen samples are sequentially added and stored in the accumulating register 126-1. After the sampling period, the accumulated sum is divided by 16 in divider 128 before the signal is used in calibration and tare circuitry 130. The process of averaging the sampled signals multiple times prior to utilization provides a more reliable signal less affected by disturbances in and around the scale. In one embodiment of the invention, it has been found that the averaging technique improves the accuracy of the system by a factor of 2 to 4 times in comparison to a single-sample system.

The calibration and tare circuitry 130 obtains the tare weight and slope during calibration to provide during weighing a signal representative of the net weight of product in the scale. The net weight signal is then transmitted to the scale memory table 14 for storage and use during a search operation.

COMBINATION SEARCH

In other combination weighing systems, the technique of locating the best combination of scales is comprised of examining every combination possible and comparing the various combinations with one another until the minimum combination providing a weight equal to or greater than a given target weight is found. This technique requires that the microprocessor examine $2^n-1$ combinations where "n" is the number of operative scales being examined. However, by establishing a special search sequence having consecutive steps in which the previously examined combinations are added to one new scale not examined in the previous step, it is possible to omit or skip certain steps of the sequence and thereby reduce the cycle time for each search operation. For example, if a particular combination of scales has been previously searched and that combination yields a total weight equal to or in excess of the target weight, there is no further need to examine other combinations in which the previously searched and qualified combination is included. In other words, another combination of lesser weight cannot be found by adding other scales to the previously searched and qualified combination.

This concept is more clearly understood by examining a search sequence established in accordance with the present invention and by discussing an example which illustrates the point. FIG. 8 shows a chart listing all 15 possible combinations in columns a-o that can be generated with four different scales. Furthermore, the combinations have been arranged in accordance with the sequence of the present invention which establishes a priority order among the scales. For purposes of illustration, it will be assumed that the priority corresponds to the numerical designation on the scale, the No. 1 scale having highest priority. The sequence thus established adds one new scale in each step of the sequence as illustrated in combinations a-d and then replaces the lowest priority scale in the exhausted combinations in order of priority. In other words, when combination e has been reached, all possible combinations, including the subcombination of scales 1, 2 and 3 have been examined and thus the combination of scales 1, 2 and 3 has been exhausted. The lowest priority scale, scale No. 3, is replaced by the next scale, scale No. 4, in the series. The same comments apply to combination f since the subcombination of scales 1 and 2 is exhausted and when combination h has been searched, the combination consisting of scale 1 itself has been exhausted. Thus in combination i, scale No. 1 has been replaced by the next scale, scale No. 2, in priority order.

The search sequence begins with combination a consisting only of scale No. 1. Assuming that scale No. 1 does not reach the minimum combination or target weight, the next combination b is examined. Assume also that combination b does not reach the target weight and therefore combination c is examined. If combination c exceeds the target weight and is thus a qualified combination there is no purpose in examining combination d because it is impossible for that combination to yield a lesser qualified weight than its subcombination consisting of combination c. Accordingly, combination d is omitted or skipped in the search sequence.

In order to establish the number of steps that can be skipped in the sequence, an ADDEND equal to the number of steps to advance is assigned to each combination. The addends are illustrated in FIG. 8 with their associated combinations, and a brief analysis of the addends indicates that they are equal to $2^{2-N}$, where "n" is the number of scales being searched and "N" is the number of the lowest priority scale in the combination. Applying any one of the addends to the combinations shown in the chart illustrates their utility. For example, if the combination c produces a qualified weight, then there is no need to examine combination d and thus the search sequence should skip from combination c to e. The addend value of 2 indicates that the search sequence should advance or be increased by two steps rather than one which omits combination d from the search sequence. The ability to define the addends by the expression $2^{n-N}$ is directly related to the manner or formula by which the search sequence is established as described above. Furthermore, the expression for the addend is valid regardless of the number of scales being searched as long as the search sequence is established as described.

Figure 9:
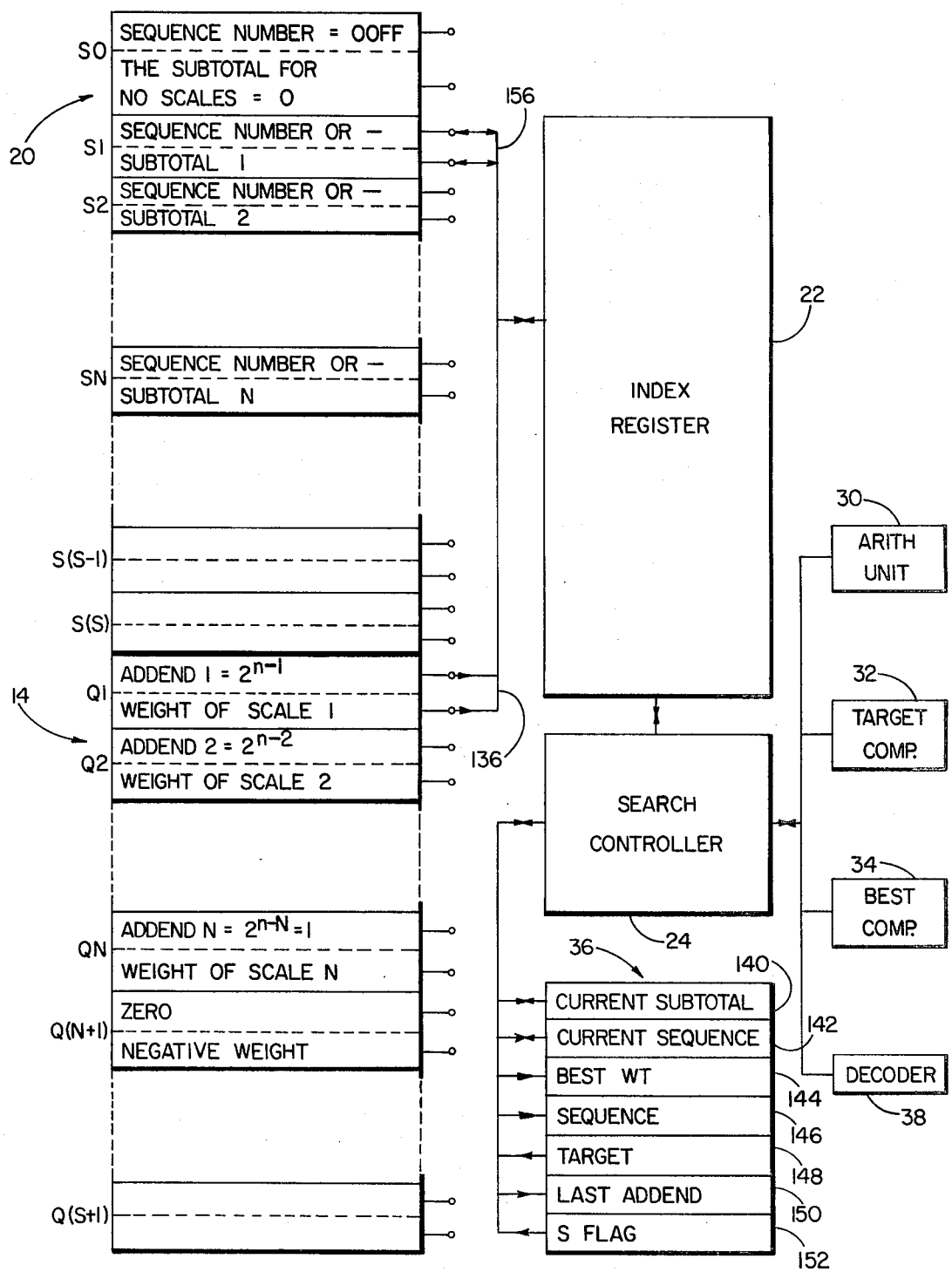
FIG. 9 is a diagram showing the details of the combination searching elements of the microprocessor in the combination weighing system.

FIG. 9 illustrates in detail the weight memory table 14, the sequence memory table 20, the index register 22, the search controller 24 and the search memory 36. These elements of the microprocessor are the primary components involved in the search operation apart from the arithmetic operations performed by the arithmetic unit 30 and comparators 32, 34.

The weight memory table 14 includes a number of memory locations or addresses which as illustrated store the weight information and associated addend for each scale. For example, the weight measured in scale 1 and the associated addend are stored at address Q1. Access to either the addend or the weight data is accomplished by the index register 22 which has a dual pointer 136 that moves between the various addresses to read the data. The addresses of the memory table are read in a predetermined order to formulate the various combinations in the search sequence. Specifically, the index register 22 starts with the data in the address Q1 and builds the combinations downwardly from that point. Therefore, the order in which the addresses are scanned establishes the priority order of the scales in the search sequence as described in connection with FIG. 8, and by loading the weight data of a particular scale at a given address, a given priority is assigned to that scale. It will be understood that because a given address represents a given priority, the addend data at a given address only changes with the total number of scales being searched.

The ability to establish priority among the plurality of scales may be used advantageously to ensure that all scales in the system receive approximately the same activity over a number of loading and dumping cycles. For example, if one scale is not dumped over a period of cycles, the product may gather moisture or otherwise deteriorate, or may not flow satisfactorily through the packaging machine in the same manner as the fresher product from other scales. This situation is remedied by ensuring that the oldest scales, that is the scales that were not included in the best combination dumped in the previous cycle, are given priority in subsequent search.

The assignment of priority is readily accomplished in the weight memory table 14 by pushing the weight data from the lower priority addresses toward the top of the table after dumping and clearing the weight data of the dumping scales from the table. Pushing or moving data upwardly from the bottom toward the top of a memory stack is an elementary data processing function.

The memory table 14, in addition to having one address for each scale, has one additional address Q(n+1) in which a large negative weight is stored with a zero addend. This data is used in the search routine as described in further detail below to indicate that the last scale in the priority order has been examined and that either the search is done or other subcombinations should be examined.

Additionally, the memory table 14 may have further addresses Q(S+1) to handle spare scales that are used to achieve best combinations from a greater plurality of scales.

The search of various combinations of scales in a search sequence is regulated primarily by the search controller 24, and the controller causes the pointer 136 of the index register 22 to move back and forth between the various addresses of the weight memory table 14 to obtain the weight data for processing through the arithmetic unit 30 and the comparators 32, 34.

The search memory 36 maintains a current record of important parameters during a search operation. At address 140, the memory stores the current subtotal for the particular combination of scales being examined at a given step in the search sequence. The step of the sequence corresponding to that combination is stored in coded form at address 142. The best weight revealed in previous steps of the search sequence and the corresponding best combination identified by the sequence number which produced that weight are stored in memory addresses 144 and 146, respectively. The best weight data is, of course, utilized by the comparator 34 in each comparison step. The combination of scales which produces that weight is uniquely associated with the sequence number at address 146 and the actual combination can be derived from the sequence number through the decoder 38. The target weight is a fixed parameter and is stored at the beginning of the search operation at address 148. The last addend at address 150 is stored at the end of a search operation and is utilized to decode the best combination sequence number and determine the combination. S-flag information at address 152 is utilized as an instructional command to permit the search sequence to start.

The structure of the sequence memory table 20 is essentially similar to the structure of the memory table 14, and data is entered, read and expunged from the table 20 at addresses identified by the index register through the dual pointer 156. It must be understood that the index register 22 is a single register with the pointers 136 and 156 ganged and operated jointly.

The function of the sequence table 20 during a search is to maintain a record of the exhausted and unexhausted combinations together with the associated subtotals of the weights in those combinations. Additionally, the table 20 utilizes the sequence number or alternatively a negative punctuation mark or number to assist the index register in advancing through the search sequence with steps omitted as defined above. Specific operations of the sequence table 20 are discussed in greater detail below in conjunction with FIGS. 10A and 10B.

Figure 10A:
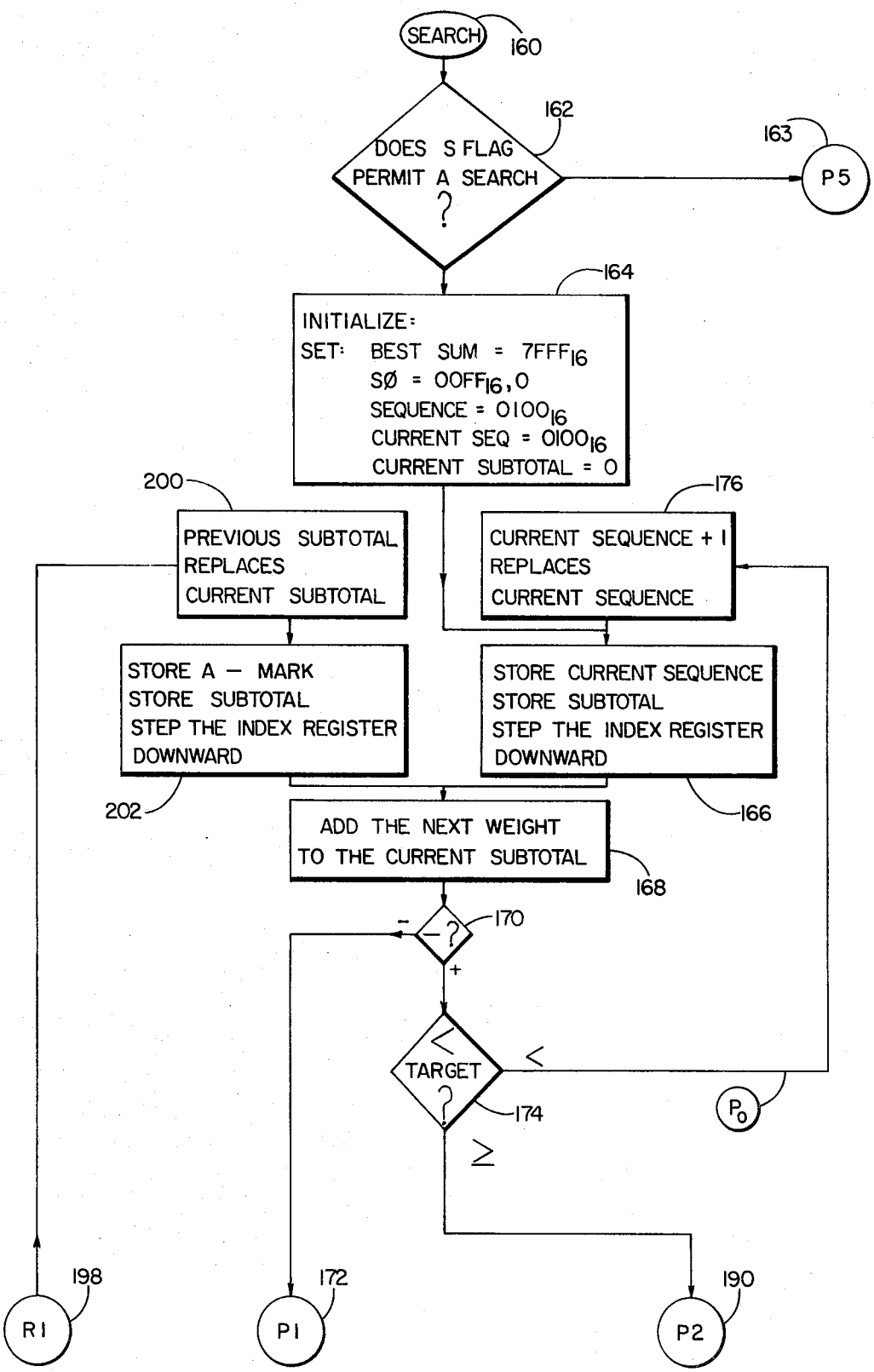
FIGS. 10A and B are a flow chart of the combination search routine.
Figure 10B:
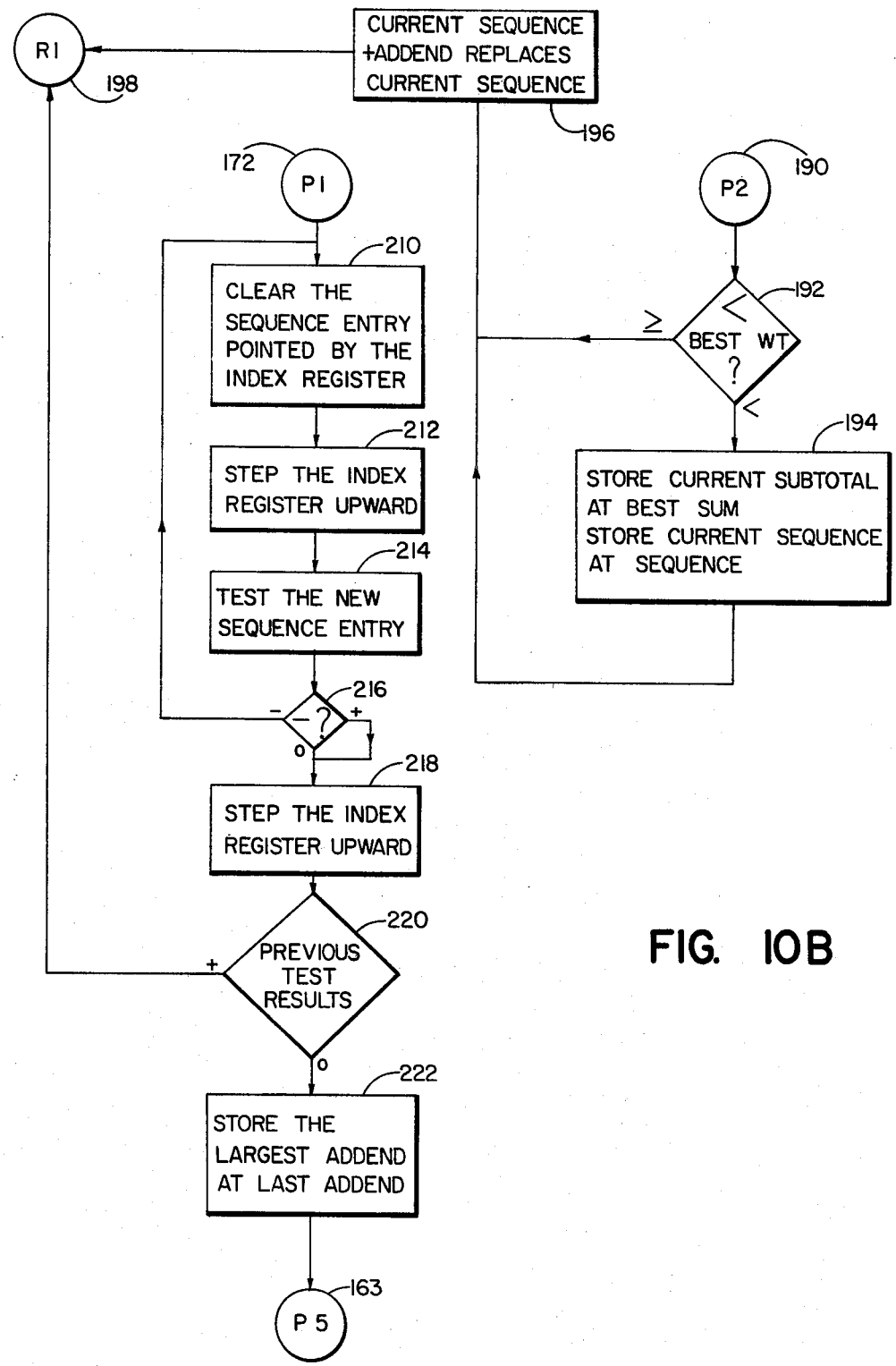

FIGS. 10A and 10B comprise the flow chart defining the programmed search routine performed by the search controller 24. The search routine is entered at 160 and initially examines the S flag at branch 162 to determine if a search routine should be carried out. The S flag is stored in memory 36 after each of the scales has been loaded and a weight on the scale is confirmed. If loading is not complete, no S flag signal is given and the search routine is exited at 163. The search controller may then wait and reenter the search routine or take other remedial steps until the S flag indicates that a search may proceed with selected scales identified in the weight memory 14.

At the first instruction 164 of the search operation, initial values of the search sequence number and weight subtotals are set in the sequence table 20. The initial value set in the table at address S0 in FIG. 9 represents step 0 of the sequence and the corresponding weight is also 0; however, in a microprocessor, the digital codes entered for these numbers may not be numerically equivalent.

As indicated at instruction 166, the current sequence number and subtotal are stored in the sequence table 20 and the memory 36 without consequence at this step of the sequence, and the pointer of the index register are stepped downwardly to addresses S1 and Q1. At instruction 168, the weight of scale 1 is added to the current subtotal, then being 0, at address 140 in the search memory 36. The new subtotal is then examined at branch 170 to determine if the last and lowest priority scale in the table 14 had been examined, and thus a subcombination was exhausted. A large negative value is always obtained under these circumstances by storing at address Q(n+1) of the memory table 14 a negative weight value well in excess of any expected weight produced by the combinations of the scales. If the negative value is obtained, then the program branches to a subroutine P1 at 172 as described further below.

If the subtotal is positive at branch 170, a second test is ordered at branch 174 to determine if the subtotal is less than the target weight stored in the search memory 36. This test is performed by the comparator 32. If the subtotal is less than the target weight, the corresponding combination is not qualified to form a package since it is a general rule of the search process that any qualified combination must equal or exceed the target weight. Unqualified weights follow the program branch P0 from the branch 174 to instruction 176 which causes the current sequence number, being 0, in memory 36 to be increased by 1.

Figure 11:
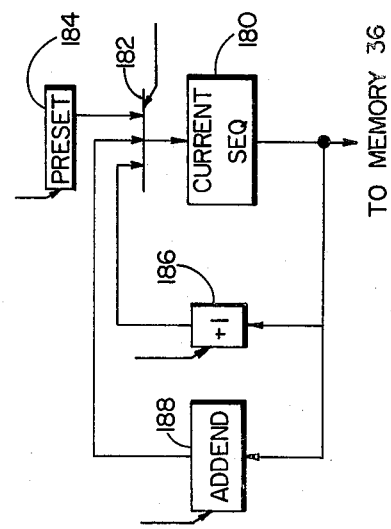
FIG. 11 is a schematic diagram of the sequencer utilized in the search routine.

The instruction 176 is pursued with the aid of a digital sequencer within the search controller 24, and FIG. 11 illustrates one embodiment of the sequencer in greater detail. The sequencer includes a CURRENT SEQUENCE register 180 which is loaded through a clocked control gate 182 from one of several sources. A preset sequence number is loaded into the register 180 from preset data 184 during the initialization operation detailed at instruction 164 in FIG. 10A. During the course of a search operation, the instruction 176 of FIG. 10A enables the +1 adder 186 so that the current sequence number is increased by one and the increased value is then loaded into the register through the gate 182. The output of the register is also stored in the search memory 36. An ADDEND adder 188, which may be enabled at a later phase of the search operation, adds to the current sequence number the addend associated with the new scale in a searched combination and loads the sum in the register 180 through the gate 182. Thus, the sequencer of FIG. 11 can be advanced in single or multiple steps depending upon the enabled adder and the value of the addend.

In accordance with instruction 166 in FIG. 10A, the new, current sequence number, now step 1, together with the associated subtotal, which is the weight of the first combination, that is, scale 1, are now stored at address S1 in the sequence register 20 and in the search memory 36. Since the subtotal has not qualified at or above the target weight, the subtotal is needed to establish the weight of other combinations in subsequent steps of the search sequence. Storage of the subtotal in this manner minimizes the number of arithmetic operations that must be made to determine subtotals developed from a plurality of scales.

Instruction 166 also indexes both pointers 156 and 136 of the index register downwardly to the next address spaces in the tables 14 and 20, and the cycle through the branch P0 is repeated with additional weights from lower priority scales being added until eventually the test 174 identifies a weight in excess of the target weight. The associated combination is now qualified and the search process advances to subroutine P2 at 190.

Subroutine P2 is illustrated in greater detail in FIG. 10B. At test 192 conducted by the best-weight comparator 34, the subtotal for a qualified combination is compared with the best previous weight to determine if a lesser qualified weight is provided by the subtotal. If the subtotal is less, then instruction 194 causes the new best subtotal to be stored in the search memory 36 together with the sequence number. If the subtotal is equal to or greater than the previous best sum, no change in the search memory occurs. Rejection of combinations equal to the previous best weight combinations gives priority to the older scales at this point.

Regardless of the results of test 192, instruction 196 causes the addend circuitry 188 in FIG. 11 to add to the current sequence the addend associated with the lowest priority scale in the qualified combination. It is this feature of the search operation which allows one or more steps of the search sequence to be omitted as explained above in connection with FIG. 8. The omission of unnecessary steps in the search sequence which is an iterative process reduces the search time and allows the system to be shared among several groups of scales or to handle larger numbers of scales more efficiently. From instruction 196, the search operation proceeds to subroutine R1 at 198.

The R1 subroutine is illustrated in FIG. 10A and includes instruction 200 that causes the previous subtotal, that is the subtotal stored in the previous address of the the sequence table, to be entered in the next address of the sequence table. This step of the operation enables unexhausted subcombinations of the qualified combinations to be further considered in the search process. For example, if the combination c in FIG. 8 proved to be a qualified combination, then the subtotal of combination b would be stored at the next address in the sequence table for use in determining the weight of combination e.

In instruction 202, the address bearing the previous subtotal is flagged by entering a negative punctuation mark or number with the previous subtotal to identify that subtotal as being exhausted the next time that that address of the table is examined through the pointers 156 of the index register as explained below in connection with subroutine $P_1$. Such a punctuation mark enables the microprocessor to readily identify and expunge from the table sequences and subtotals which have no further utility in a given search operation. The instruction 202 also causes the previous subtotal to be stored in the search memory 36 and indexes the pointer 136 downwardly to the next scale in the weight 14.

The search continues by adding the weight of the next scale as indicated at instruction 168 and repeating subroutines $P_0$, $P_1$ or $P_2$ as described above.

After the lowest priority scale has been tested in a combination, the next movement of the pointer 136 causes the test 170 to divert the program to subroutine P1 shown in FIG. 10B. Under these conditions, the search is either finished because all combinations have been tried or the search has reached an intermediate stage in the sequence where a subcombination has been exhausted. Subroutine P1 causes the pointer 156 to index upwardly through the sequence memory table 20 to either the initial $S_0$ when the search is finished or to some intermediate address in the table where the sequence entry identifies a new unexhausted subcombination.

Accordingly, having determined that the lowest priority scale has been examined, the first instruction 210 of the subroutine P1 clears the sequence entry at the current address of the sequence table and indexes the pointer 156 upwardly to the preceding address as indicated at instruction 212. The sequence entry is tested according to the instruction 214, and the test is carried out at 216 to determine if the sequence entry is either a positive sequence number, a negative punctuation mark or zero. The negative number indicates that the combination associated with that previous entry was exhausted, and in that event, the entry is cleared and the pointer 156 is stepped further upward through the sequence table by again following the instructions 210–214. If the sequence entry is positive at test 216, then the subcombination is not exhausted and the program proceeds to instruction 218. Also, if the entry is zero, indicating that the address $S_0$ has been reached in the table, the same instruction 218 is pursued. Instruction 218 moves the pointer 156 one step further upward in the table 20 to reach the unexhausted combination if a search is not over. To determine whether the search is over or not, the results from the test 216 are re-examined at the test 220. Assuming that the search is not over, the sequence entry will be positive and the search is thus continued to examine other combinations, including the unexhausted combination through subroutine R1 as indicated at 198.

Eventually, all of the subcombinations are exhausted and the results of the test 220 indicate that the pointer 156 has reached address $S_0$. The zero entry in the sequence number location is identified and in that event, instruction 222 causes the largest addend to be entered in the "LAST ADDEND" location of the search memory 36, and the subroutine is exited at 163. The microprocessor utilizes the last addend figure in decoding the best sum combination from the sequence number. The largest addend is indicative of how many scales were utilized in the search and is a key element in decoding the sequence number.

In summary, a combination weighing system has been described in which a novel scale calibration system is used to establish calibrated measurements from the scale between weighing operations. The signal produced by the scale is used in a combination weighing system having a plurality of similar scales, and in order to improve the reliability and accuracy of the measurements, the weight signals are averaged after multiple samples are taken. To determine the best combination of the scales approaching a target weight, combinations of the weights from the scales are examined on the basis of a predetermined search sequence, and certain steps of the sequence are omitted to shorten the search operation.

While the present invention has been described in a preferred embodiment, it should be understood that numerous modifications and substitutions can be made without departing from the spirit of the invention. For example, it is not essential to utilize the precise scale structure shown in FIGS. 2–5 in the combination system shown in FIG. 1. Other scales providing weight signals may also be used. The averaging technique improves reliability of the weight signals, but it not essential to the described searching operation. The searching process may be carried out with the same number of scales in each cycle of operation, or the microprocessor may omit from successive cycles those scales that have not been reloaded. Accordingly, the present invention has been described in a preferred embodiment by way of illustration rather than limitation.

We claim:

1. A combination weighing system to search for and obtain a minimum qualified weight of product not less than a target weight from among multiple quantities of the product comprising:

a plurality of weighing scales, each receiving and weighing a quantity of the product and providing a weight signal representative of the weight of the product in the scale;

arithmetic means connected with the plurality of scales to receive the weight signals for determining the combined weight of the product in selected combinations of the scales during a search operation;

first means for comparing the combination weights with a target weight to identify qualified combination weights at and above the target weight;

second means for comparing qualified combination weights with the other qualified combination weights to establish the minimum qualified weight and corresponding combination of scales;

memory means for storing the best minimum qualified weight and corresponding combination; and search control means for controlling the search of various combination of scales in an ordered search sequence and including means for omitting from the sequence a combination of scales having a subcombination previously searched and found to be qualified.

2. A combination weighing system to obtain a minimum combination as described in claim 1 further including a memory connected with the plurality of scales for storing the weights of product in each scale individually for rapid access during a search operation.

3. A combination weighing system as defined in claim 1 wherein:
the search control means has a programmed search sequence in which the combinations at each step of the sequence have one scale from the plurality different from combinations examined at previous steps in the search sequence; and
the means for omitting comprises a search sequencer registering a currently searched sequence number corresponding to a given combination of scales and means for advancing the sequencer in single and multiple steps.

4. A combination weighing system as defined in claim 3 wherein the means for advancing the sequence comprises a single step adder and means for adding addends uniquely related to said new scale in the combination of the currently searched sequence.

5. A combination weighing system as defined in claim 3 wherein the weighing scales are periodically dumped in accordance with the search combination which provides the minimum qualified weight;
a scale memory table is provided in which the weights of each scale in the plurality of scales searched in a given search operation are loaded in the memory table in order of the oldest scales first; and
the search control means establishes a search priority based upon the order in which the weights of the scales are loaded in the memory table.

6. A combination weighing system as defined in claim 1 wherein the weighing scales are dumping scales selectively dumped after a search operation according to the combination providing the minimum qualified weight, and the ordered search sequence gives the most recently dumped scales lower priority.

7. A combination weighing system as defined in claim 1, including a sequence memory table controlled by the search control means to record the combinations and subcombinations of scales having utility in subsequent steps of the search sequence and to expunge the combinations and subcombinations having no further utility in the search sequence.

8. A combination weighing system as defined in claim 7 wherein the sequence memory table has designated memory addresses and storage locations for weight combinations equal in number to the number of scales in the plurality.

9. A combination weighing device as in claim 8 wherein the sequence memory table additionally has designated storage locations for the sequence number or a punctuation mark with each stored weight combination.

10. A combination weighing system as defined in claim 7 further including indexing means controlled by the search control means for identifying in the sequence memory table the addresses to be loaded and unloaded in the search operation.

11. A combination weighing system as defined in claim 10 wherein the indexing means comprises an indexing register having pointers movable sequentially and reversibly back and forth between a series of memory addresses storing combinations and subcombinations in the search operation.

12. A combination weighing system as defined in claim 1 further including sequence memory means for storing unexhausted combinations and corresponding weights during the course of a search operation.

13. A combination weighing system as defined in claim 12 wherein the sequence memory table also stores data guiding the search control means through the ordered search sequence.

14. A combination weighing system as in claim 13 further including a weight memory table storing weight data in a predetermined order corresponding to a priority order of scales searched by the control means in the search sequence.

15. A method of searching a plurality of loaded weighing scales for the combination of scales providing a minimum total weight not less than a given target weight comprising:
establishing a search sequence of n scales having $2^n - 1$ combinations in which the consecutive steps of the sequence consist of previously examined subcombinations plus one new scale not examined in the previous step;
adding the scale weights of the combination in each step of the sequence to obtain a combination of weights;
comparing the combination weights with a target weight to establish qualified combination weights not less than the target weight;
comparing the qualified combination weights with the best previous weight to establish the minimum qualified weight and corresponding best combination; and
omitting from the search sequence those combinations having subcombinations previously searched and found to be qualified.

16. A method of searching a plurality of scales for the minimum total weight as defined in claim 15 further including the steps of
dumping and reloading the scales of the best combination to perform a new search; and
assigning priority in the new search to the scales not included in the best combination of the previous search.

17. A method of searching as defined in claim 16 wherein the step of assigning priority comprises loading the weight data for each scale into a memory table having addresses searched in a predetermined order, and the step of loading further includes loading the weight data for the scales not included in the best combination of the previous search at the addresses having highest priority in the search order.

18. A method of searching a plurality of scales for the minimum total weight as defined in claim 15 wherein the new scales are added to the combinations of the sequence in order of priority or replace the lowest priority scale in exhausted combinations in order of priority to establish the search sequence; and the step of omitting comprises assigning to each combination an addend equal to $2^{n-N}$, where n is the number of scales being search and N is the number of the lowest priority scale in the combination, and after finding a combination having a qualified combination weight, skipping through the search sequence by a number of steps equal to the addend of the lowest priority scale in the combination.

19. A method of searching a plurality of scales for the minimum total weight as defined in claim 15 including the step of keeping current during the search a record of the unexhausted subcombination and corresponding weights in a sequence memory table.

20. A method of searching as defined in claim 19 wherein the sequence memory table has an associated index register for reading the table, and a pointer of the register is indexed between ordered locations of the table for storing and flagging subcombinations of scales at the locations designated by the pointer.

* * * * *